United States Patent [19]

Moran

[11] Patent Number: 5,095,055

[45] Date of Patent: * Mar. 10, 1992

[54] USING BRANCHED POLYMERS TO IMPROVE THE STORAGE STABILITY OF ACID TREATED POLYMER MODIFIED ASPHALTS (PNE-577)

[75] Inventor: Lyle E. Moran, Sarnia, Canada

[73] Assignee: Exxon Research and Engineering Company, Florham Park, N.J.

[*] Notice: The portion of the term of this patent subsequent to Dec. 3, 2008 has been disclaimed.

[21] Appl. No.: 517,776

[22] Filed: May 2, 1990

Related U.S. Application Data

[63] Continuation-in-part of Ser. No. 397,215, Aug. 23, 1989, which is a continuation-in-part of Ser. No. 237,028, Aug. 29, 1988, abandoned.

[51] Int. Cl.$^5$ ............................................... C08L 95/00
[52] U.S. Cl. ........................................ 524/59; 524/68; 524/69; 524/70; 524/71
[58] Field of Search ....................... 524/59, 68, 69, 70, 524/71

[56] References Cited

U.S. PATENT DOCUMENTS

| | | | |
|---|---|---|---|
| 4,440,886 | 4/1984 | Kraus | 524/59 |
| 4,460,723 | 7/1984 | Rollmann | 524/59 |
| 4,882,373 | 11/1989 | Moran | 524/68 |

*Primary Examiner*—Melvyn I. Marquis
*Attorney, Agent, or Firm*—John W. Ditsler

[57] ABSTRACT

This invention relates to a composition and method for improving the storage stability of acid treated polymer modified asphalts. More specifically, the storage stability of an asphalt which contains greater than 1.0 wt. % polymer can be improved by adding a branched, rather than a non-branched, polymer to an asphalt which has previously been reacted with an inorganic acid. The storage stable acid treated branched polymer modified asphalt thus produced is particularly well suited for use as a binder in paving materials and as a coating or saturant for roofing shingles.

37 Claims, No Drawings

USING BRANCHED POLYMERS TO IMPROVE THE STORAGE STABILITY OF ACID TREATED POLYMER MODIFIED ASPHALTS (PNE-577)

CROSS-REFERENCE TO RELATED APPLICATIONS

This application is a continuation-in-part of U.S. Ser. No. 397,215 filed Aug. 23, 1989, which is a continuation-in-part of U.S. Ser. No. 237,028 filed Aug. 29, 1988, now abandoned.

BACKGROUND OF THE INVENTION

1. Field of the Invention

This invention concerns a composition and method for improving the storage stability of acid treated polymer modified asphalts using branched polymers.

2. Discussion of Related Art

Asphalt is a bituminous material resulting from the distillation of crude oil. Typically, asphalt is derived from the bottoms of a vacuum distillation tower and has an atmospheric boiling point of at least 380° C. Because it is hydrophobic and has good adhesiveness and weatherability, asphalt has been used widely as a binder in paving materials and as a coating for roofing shingles.

Frequently, polymeric materials have been added to asphalt to enhance its rheological properties, i.e., to improve its creep resistance above about 20° C. Polymer modified asphalts must also have good phase compatibility between the asphalt and polymer, and be storage stable at high temperatures for ease of handling and application. Compatibility between the polymer and asphalt is very important to ensure that the properties of both are transferred to the finished product for good long term performance. Poor storage stability will render the polymer modified asphalt unsuitable for use in paving binder applications, roofing applications, and other industrial specialty products. Accordingly, various methods have been suggested for maintaining storage stability.

One method requires continuous mixing of the asphalt/polymer mixture to avoid phase separation (See, for example, U.S. Pat. Nos. 4,240,946 and 4,314,921, which require high shear mixing to obtain physical dispersion of a polyolefin in bitumen. See also Transportation and Road Research Laboratory Report 1101 by J. H. Denning et. al., Highways and Structures Department, Crowthorne, Berkshire, England (1983)). Another method discloses adding one or more dispersants to a polyethylene modified asphalt to avoid phase separation (See Jew et al., Journal of Applied Polymer Science, 31, pp.2685-2704 (1986)).

In yet another method, the composition of the asphalt is tailored to ensure compatibility with the polymer used or the polymer is selected to be compatible with the asphalt (See U.S. Pat. Nos. 4,868,233 and 4,873,275, the disclosures of which are incorporated herein by reference).

In still another method, polymer modified asphalt is stabilized by the addition of an acid after the polymer has been added to the asphalt (See, for example, German patent DE 22 55 173 C3 which discloses stabilizing mixtures of asphalt and styrenic thermoplastic elastomers (styrene-butadiene-styrene) by adding small amounts of 85% o-phosphoric acid or 36% hydrochloric acid to the asphalt/SBS mixture). More recently, U.S. Ser. No. 397,215 filed Aug. 23, 1989, discloses that the storage stability of acid treated polymer modified asphalts can be improved if the acid is added to the asphalt before the polymer.

However, none of these methods, alone or in combination, disclose that the storage stability of acid treated polymer modified asphalts can be further improved if a branched, rather than a non-branched, polymer is added to the asphalt.

SUMMARY OF THE INVENTION

This invention relates to a composition and method for further improving the storage stability of acid treated polymer modified asphalts. More specifically, the storage stability of an acid treated asphalt containing greater than 1.0 wt. % of a polymer can be further enhanced if branched, rather than non-branched, polymers are added to the asphalt.

DETAILED DESCRIPTION OF THE INVENTION

This invention requires asphalt, an inorganic acid, and a branched polymer.

The asphalt used in this invention may be obtained from a variety of sources including straight-run vacuum residue; mixtures of vacuum residue with diluents such as vacuum tower wash oil, paraffin distillate, aromatic and naphthenic oils, and mixtures thereof; oxidized vacuum residues or oxidized mixtures of vacuum residues and diluent oils; and the like. Other asphaltic materials such as coal tar pitch, rock asphalt, and naturally occurring asphalt may also be used. Typically, the asphalt will have an atmospheric boiling point of at least 380° C., more typically of at least 440° C., and an asphaltene content of between about and about 30 wt. % as determined by ASTM D4124. In paving binder applications, the asphalt will typically comprise 85, preferably 90, wt. % or more of the acid treated polymer modified product (i.e., the final product). The asphalt will typically comprise 80, preferably 85, wt. % or more of the final product when it is used in roofing applications.

An inorganic acid is then contacted with, or added to, the asphalt to form an acid treated asphalt. In general, acid addition improves the temperature susceptibility of the asphalt and the stability of the acid treated polymer modified blend. Preferably, the inorganic acid is added slowly to the asphalt to avoid foaming which may occur if all the acid were added at one time. The inorganic acid content of the asphalt is not critical, but normally should range between about 0.2 and about 5.0 wt. %, preferably between about 0.25 and about 3.0 wt. %, of the asphalt. Although a wide variety of inorganic acids can be used, the inorganic acid will preferably be selected from the group consisting of hydrochloric acid, phosphoric acid, phosphorus pentoxide, sulfuric acid, and mixtures thereof. The term "inorganic acid" is meant to include compounds that are capable of forming an inorganic acid when contacted with the asphalt (e.g., chlorinated paraffin wax and polyvinyl chloride release hydrochloric acid when contacted with hot asphalt). Hydrochloric acid, phosphoric acid, phosphorus pentoxide, and mixtures thereof are preferred inorganic acids, with phosphoric acid being particularly preferred.

Following acid addition, a branched polymer is then added to the acid treated asphalt to form an acid treated polymer modified asphalt that has enhanced storage stability relative to the storage stability obtained if a non-branched polymer (or a less branched polymer)

were added to the acid treated asphalt. However, the amount of polymer added to (or present in) the acid treated asphalt must be greater than 1.0 wt. % (preferably at least 1.5 wt. % and more preferably at least 2.0 wt. %) to obtain an enhancement in storage stability because at polymer concentrations of 1.0 wt. % or less, polymer modified asphalts appear to be storage stable without acid addition. Conversely, polymer modified asphalts are believed to become increasingly less stable as the polymer concentration in the asphalt increases above 1.0 wt. %. However, the upper limit on the amount of polymer in the asphalt is not critical and can range up to 20 wt. % or more based on weight percent of the acid treated asphalt, although amounts below 20 wt. % are preferred. Therefore, the amount of polymer in the asphalt will typically range from above 1.0 to about 20 wt. % based on weight of the acid treated asphalt. Preferably, the amount of polymer in the asphalt will range from about 1.5 to about 20 (preferably 15) wt. % and more preferably from about 2.0 to about 15 wt. %. When used as a paving binder, the acid treated polymer modified asphalt normally contains from about 3 (preferably 4) to about 8 wt. % polymer. When used for roofing applications, the acid treated polymer modified asphalt normally contains from about 8 to about 20 wt. % (preferably 15 wt. %) polymer.

A wide variety of branched polymers may be used in this invention. By "branched polymer" is meant a polymer in which a non ring carbon atom is directly bonded to 3 or 4 other carbon atoms that may be either rings or chains. Suitable branched polymers include both thermoplastics and thermosets, as defined by ASTM D 883-69 Standard Definitions of Terms Relating to Plastics, the disclosure of which is incorporated herein by reference. ASTM D 883-69 defines a thermoplastic as a polymer that can be repeatedly softened when heated and hardened when cooled. A thermoset is defined as a polymer that can be changed into a substantially infusible or insoluble product when cured by heat or by chemical means.

Examples of suitable thermoplastics include acetals (e.g., polymers and copolymers of formaldehyde), acrylics, acrylonitrile-butadiene-styrene plastics, cellulosics (such as cellulose acetate, propionate and acetate-butyrate), chlorinated polyethylene, fluorocarbons, nylon, polycarbonates, polyethylenes, polyphenylene oxides, polyphenylene sulfides, polypropylene, polystryene, polysulfone, polyvinyl acetates, polyvinyl alcohols, polyvinyl chlorides, polyvinylidine chloride, styrene-acrylonitrile plastics, saturated polyesters, and thermoplastic elastomers of all classes including urethanes, polyesters, styrenics and olefinics. Preferred thermoplastics are polyethylene, ethylene methacrylate, ethylene-propylene elastomer, ethylene-vinyl acetate, nylon, uncured ethylene-propylene-diene terpolymers, and uncured thermoplastic styrenic elastomers (e.g., styrene-butadiene-styrene block copolymers), with ethylene methacrylate, ethylene-vinyl acetate, or their mixtures being most preferred.

Examples of suitable thermosets include amino resins (e.g., melamine-formaldehyde, urea-formaldehyde, and mixtures thereof), phenolics, polyimides, polyurethanes, polysulfides, silicone rubbers, unsaturated polyesters, and vulcanized (i.e., cured) rubbers (e.g., natural rubbers and cured elastomers such as ethylene-propylene-diene terpolymers and styrene-butadiene-styrene block copolymers). Preferred thermosets are polyimides, polyurethanes, and vulcanized rubbers. Most preferred are polyurethanes, cured elastomers, or their mixtures.

As used herein, "branched polymer" also includes derivatized analogues of these polymers such as polymers grafted with maleic anhydride (e.g. ethylene vinyl acetate—maleic anhydride) or polymers grafted with sulfur or chlorine (e.g. sulfonated polyethylene, chlorinated polyethylene, and the like).

The particular branched polymers used may be readily obtained in the marketplace from various chemical suppliers. Accordingly, their methods of preparation are well known to those skilled in the art (See Encyclopedia of Polymer Science and Technology, Interscience Publishers, New York (1971); Kirk-Othmer Encyclopedia of Chemical Technology, Wiley-Inter-science, 3rd Ed., New York (1981); G. L. Kinney, Engineering Properties and Applications of Plastics, John Wiley & Sons, New York (1957); and Plastics in Building, edited by Irving Skeist, Reinhold Publishing Corporation, New York (1966), the disclosures of which are incorporated herein by reference).

The conditions at which the acid and branched polymer are added to the asphalt are not critical and will vary with the particular asphalt and polymer used. However, the conditions will be within the ranges normally used for acid or polymer addition to asphalt. For example, acid is normally added slowly to the asphalt (typically, over a period of from about 1 to about 3 hours) at a temperature of from about 150° C. to about 250° C., preferably from about 180° C. to about 210° C. Once a substantial amount (preferably all) of the acid has been added, the acid treated asphalt is mixed for an additional period of time (typically from about 0.5 to about 1 hour, although longer times could be used because no further reaction is likely to occur once all of the acid has been reacted or depleted). The branched polymer is then added to the acid treated asphalt at a temperature of from about 150° to about 300° C., preferably from about 175° to about 230° C. Typically, the polymer will be added over a period of from about 1.5 to about 3 hours to ensure adequate dispersal of the polymer. Although the polymer can be added over a longer period of time, it is important not to add the polymer over too short a period because the polymer could then melt and coalesce when contacted by the hot acid treated asphalt. This would slow dispersal of the polymer in the asphalt. Once polymer addition is complete, the acid treated polymer modified asphalt is mixed for an additional 0.5 to 1.5 hours or more.

The asphalt may be mixed or blended with the acid and polymer in any number of ways that can readily be selected by one skilled in the art. Suitable means include external mixers, roll mills, internal mixers, Banbury mixers, screw extruders, augers, and the like. Normally, the mixing or blending during acid and polymer addition will be at ambient pressure.

An oxygen-containing gas (such as air) may be added to the asphalt before or during acid and polymer addition if desired. However, in a preferred embodiment of this invention, the gas is not added before or during either step because it would tend to produce asphaltenes, which would have a detrimental effect on the storage stability of the final product.

The acid treated branched polymer modified asphalt thus formed may be employed in essentially any application requiring asphalt-based products with superior storage stability. Examples of such applications include adhesives, coatings, fabricated products, road and roofing applications, sealants, sound and vibration dampening products, water proofing membranes and the like. However, the final product is particularly well suited for use as a paving binder, particularly a binder in the load bearing course as well as the top or surface course of hot mix pavement structures.

The present invention will be further understood by reference to the following Example which is not intended to restrict the scope of the claims appended hereto. In the Example, the storage stability of the acid treated polymer modified asphalts tested was measured by placing a 200 gram sample in a copper tube (10 inches high and 1 inch in diameter) and heating it to 160° C. for 5 days. Then the sample was removed from the tube and divided into top and bottom fractions. The viscosity of each fraction was measured at 135° C. and then used to calculate the ratio of the top to the bottom viscosity. A ratio of 1.0 is considered as optimum storage stability, with ratios above or below 1.0 representing mixtures that are increasingly less storage stable.

EXAMPLE

Storage Stability of Acid Treated Linear and Branch Polyethylene Modified Asphalts Tests were performed on two samples of a 300/400 penetration straight-run asphalt obtained from vacuum distillation. Phosphoric acid (85 wt. %) and linear low density polyethylene were added to one sample while the acid and branched low density polyethylene were added to the other sample. The temperature of the samples ranged between 190° and 200° C. at all times during the tests. The acid was added to the asphalt over approximately a twenty minute period followed by reaction with the asphalt for about an additional thirty minutes. Polymer was then added over approximately a two to three minute period and mixed with the acid modified asphalt for from about two to about three hours. The asphalt was stirred during acid and polymer addition. The properties of the samples tested were determined and are shown in Table 1 below.

TABLE 1

| Sample No. | 1 Linear | 2 Branched |
|---|---|---|
| Feedstock Inspections | | |
| Polymer | Low Density | Polyethylene |
| Wt. % | 5 | |
| Melt Index | 12 | |
| Density | 0.923 | 0.917 |
| Asphalt, wt. % | | 93.0 |
| Penetration at 25° C., mm/10 | | 310 |
| H$_3$PO$_4$ (85%), wt % | | 2.0 |
| Product Inspections | | |
| Softening Point, °C. | 54 | 54 |
| Penetration at 25° C., mm/10 | 96 | 95 |
| Viscosity | | |
| at 60° C., Pa · S | 798 | 813 |
| at 135° C., cSt | 2170 | 2009 |
| Storage Stability at 160° C. | 2.0 | 1.3 |

The data in Table 1 show that the branched low density polyethylene gives the asphalt better storage stability than does the linear low density polyethylene.

What is claimed is:

1. In a method for improving the storage stability of an asphalt that contains from above 1.0 to about 20 wt. % of a polymer which comprises (a) adding from about 0.2 to about 5 wt. % of an inorganic acid to the asphalt to form an acid treated asphalt, and thereafter, (b) adding the polymer to the acid treated asphalt to form an acid treated polymer modified asphalt, the improvement which comprises adding a branched polymer to the acid treated asphalt to form a polymer modified asphalt that has improved storage stability relative to that obtained if a non-branched polymer had been added.

2. The method of claim 1 wherein the acid is selected from the group of hydrochloric acid, phosphoric acid, phosphorus pentoxide, sulfuric acid, and mixtures thereof.

3. The method of claim 2 wherein the acid is selected from the group consisting of hydrochloric acid, phosphoric acid, and mixtures thereof.

4. The method of claim 1 wherein from about 0.25 to about 3 wt. % of the acid is added to the asphalt.

5. The method of claim 4 wherein from about 1.5 to about 15 wt. % of the branched polymer is present in the acid treated asphalt.

6. The method of claim 5 wherein the branched polymer is a thermoplastic polymer, a thermoset polymer, or their mixtures.

7. The method of claim 6 wherein the thermoplastic polymer is polyethylene, ethylene methacrylate, ethylene-propylene elastomer, ethylene-vinyl acetate, nylon, uncured ethylene-propylene-diene terpolymers, uncured thermoplastic styrenic elastomers, or mixtures thereof.

8. The method of claim 6 wherein the thermoset polymer is polyimides, polyurethanes, vulcanized rubber, or mixtures thereof.

9. The method of claim 1 where from about 1.5 to about 15 wt. % of the branched polymer is present in the asphalt.

10. In a method for improving the storage stability of an asphalt containing from above 1.0 to about 20 wt. % of a polymer which is thermoplastic polymer, thermoset polymer, or mixtures thereof, which comprises (a) adding from about 0.2 to about 5 wt. % of an inorganic acid selected from the group consisting of hydrochloric acid, phosphoric acid, phosphorous pentoxide, sulfuric acid, and mixtures thereof to the asphalt to form an acid treated asphalt, and thereafter, (b) adding the polymer to the acid treated asphalt to form an acid treated polymer modified asphalt, the improvement which comprises adding a branched polymer in (b) to form a polymer modified asphalt that has improved storage stability relative to that obtained if a non-branched polymer had been added.

11. The method of claim 10 wherein the acid is hydrochloric acid, phosphoric acid, or their mixtures.

12. The method of claim 11 wherein the acid comprises phosphoric acid.

13. The method of claim 10 wherein the thermoplastic polymer is ethylene methacrylate, ethylene-vinyl acetate, or their mixtures.

14. The method of claim 10 wherein the thermoset polymer is polyurethanes, cured elastomers, or their mixtures.

15. The method of claim 10 wherein the acid treated polymer modified asphalt contains at least 80 wt. % asphalt and from about 8 to about 20 wt. % polymer.

16. The method of claim 10 wherein the acid treated polymer modified asphalt contains at least 85 wt. % asphalt and from about 3 to about 8 wt. % polymer.

17. The method of claim 10 wherein the polymer added in (b) comprises branched polyethylene.

18. In an asphaltic composition containing an inorganic acid and from above 1.0 to about 20 wt. % of a polymer that is produced by the method comprising:
   (a) adding from about 0.2 to about 5 wt. % of the acid to an asphalt to form an acid treated asphalt, and thereafter,
   (b) adding the polymer to the acid treated asphalt to form an acid treated polymer modified asphaltic composition, the improvement which comprises adding a branched polymer in (b) to form an asphaltic composition that has greater storage stability relative to that obtained if a non-branched polymer had been added.

19. The composition of claim 18 wherein the acid is selected from the group consisting of hydrochloric acid, phosphoric acid, phosphorus pentoxide, sulfuric acid, and mixtures thereof.

20. The composition of claim 19 wherein the acid is selected from the group consisting of hydrochloric acid, phosphoric acid, and mixtures thereof.

21. The composition of claim 18 wherein the polymer is a thermoplastic polymer, a thermoset polymer, or their mixtures.

22. The composition of claim 21 wherein the thermoplastic polymer is polyethylene, ethylene methacrylate, ethylene-propylene elastomer, ethylene-vinyl acetate, nylon, uncured ethylene-propylene-diene terpolymers, uncured thermoplastic styrenic elastomers, or mixtures thereof.

23. The composition of claim 21 wherein the thermoset polymer is polyimides, polyurethanes, vulcanized rubber, or mixtures thereof.

24. The composition of claim 21 wherein the acid is selected from the group consisting of hydrochloric acid, phosphoric acid, phosphorous pentoxide, sulfuric acid, and mixtures thereof and the asphalt has an atmospheric boiling point of at least 380° C.

25. The composition of claim 24 wherein the acid is hydrochloric acid, phosphoric acid, or their mixtures.

26. The composition of claim 25 wherein the acid comprises phosphoric acid.

27. The composition of claim 25 wherein the thermoplastic polymer is ethylene methacrylate, ethylene-vinyl acetate, or their mixtures.

28. The composition of claim 25 wherein the thermoset polymer is polyurethanes, cured elastomers, or their mixtures.

29. The composition of claim 25 wherein the acid treated polymer modified asphalt contains at least 80 wt. % asphalt and from about 8 to about 20 wt. % polymer.

30. The composition of claim 25 wherein the acid treated polymer modified asphalt contains at least 85 wt. % asphalt and from about 3 to about 8 wt. % polymer.

31. The composition of claim 18 wherein the polymer added in (b) comprises branched polyethylene.

32. The method of claim 10 wherein the thermoplastic polymer is polyethylene, ethylene methacrylate, ethylene-propylene elastomer, ethylene-vinyl acetate, nylon, uncured ethylene-propylene-diene terpolymers, uncured thermoplastic styrenic elastomers, or mixtures thereof.

33. The method of claim 10 wherein the thermoset polymer is polyimides, polyurethanes, vulcanized rubber, or mixtures thereof.

34. The method of claim 10 wherein from about 1.5 to about 15 wt. % of the polymer is present in the acid treated asphalt.

35. The method of claim 11 wherein the polymer added in (b) comprises branched polyethylene.

36. The method of claim 12 wherein the polymer added in (b) comprises branched polyethylene.

37. The method of claim 36 wherein from about 1.5 to about 15 wt. % of the polymer is present in the acid treated asphalt.

* * * * *